United States Patent [19]
Lutz et al.

[11] Patent Number: 5,840,788
[45] Date of Patent: Nov. 24, 1998

[54] ULTRAVIOLET LIGHT RESISTANT URETHANE TOP COAT FOR GOLF BALLS

[75] Inventors: Mitchell E. Lutz, Fairhaven, Mass.; William Ellis Hatch, Valencia; Brian Louis Zanotti, Hyde Park, both of Pa.

[73] Assignee: Acushnet Company, Fairhaven, Mass.

[21] Appl. No.: 879,714

[22] Filed: Jun. 20, 1997

[51] Int. Cl.⁶ .................. C08K 5/3415; C08K 5/3477; C08K 5/353; B05D 1/36
[52] U.S. Cl. .................. 524/95; 524/100; 524/104; 524/908; 427/158; 427/261; 427/412.2; 427/511; 427/558; 473/376; 473/377; 473/378; 473/385; 40/327
[58] Field of Search .................. 524/95, 100, 104, 524/908; 427/158, 261, 412.2, 511, 558; 473/376, 377, 378, 385; 40/327

[56] References Cited

U.S. PATENT DOCUMENTS

| | | | |
|---|---|---|---|
| 4,679,974 | 7/1987 | Yamada et al. | 473/385 |
| 4,798,386 | 1/1989 | Berard | 273/235 R |
| 4,802,674 | 2/1989 | Kitaoh | 273/235 A |
| 4,865,326 | 9/1989 | Isaac et al. | 273/235 A |
| 5,156,405 | 10/1992 | Kitaoh et al. | 273/235 A |
| 5,459,220 | 10/1995 | Kennedy | 473/378 |
| 5,494,291 | 2/1996 | Kennedy | 273/235 A |
| 5,580,323 | 12/1996 | Sullivan | 473/371 |

OTHER PUBLICATIONS

Cytec Technical Bulletin, Cyagard UV–1164L.
Clariant Technical Bulletin, Sanduvor 3055, 1996.
Clariant Technical Bulletin, Sanduvor PR–25, 1996.

*Primary Examiner*—Peter A. Szekely
*Attorney, Agent, or Firm*—Pennie & Edmonds LLP

[57] ABSTRACT

The invention is directed to a UV light resistant, visibly transparent, urethane golf ball topcoat composition for use with UV curable inks and to golf balls incorporating such a topcoat. The topcoat includes an optical brightener that absorbs at least some ultraviolet light at wavelengths greater than about 350 nm, and emits visible light, and a light stabilizer package. The light stabilizer package includes at least one UV light absorber and, optionally, at least one light stabilizer, such as a HALS. The UV light absorber absorbs at least some UV light at wavelengths between about 200 nm and about 370 nm, and has an absorption peak at a wavelength between about 330 nm and about 360 nm and a UV light absorbance at a wavelength of about 350 nm that is at least about 3 times greater than the UV light absorbance at a wavelength of about 370 nm. The optical brightener is present in an amount sufficient to increase the brightness of the ball, and the light stabilizer is present in an amount sufficient to reduce or eliminate discoloration of the ball on exposure to UV light used to cure the UV curable ink. The invention also relates to a method of preventing discoloration of a golf ball upon UV curing. The method includes the steps of forming a golf ball having a cover and a core; the UV light resistant, visibly transparent, urethane golf ball topcoat composition of the invention by preparing a mixture of a polyol resin, a polyisocyanate, the optical brightener, the UV light absorber, and, optionally, the HALS. A topcoat is then formed on the golf ball with the urethane golf ball topcoat composition, and an image is formed on the topcoat with a UV curable ink. The ink is then cured by exposing the ink on the golf ball topcoat to UV light at a wavelength and in an amount and for a time sufficient to cure the ink, thereby curing the ink.

30 Claims, 3 Drawing Sheets

ULTRAVIOLET LIGHT RESISTANT URETHANE TOP COAT FOR GOLF BALLS

TECHNICAL FIELD

The present invention is directed to ultraviolet ("UV") light resistant urethane golf ball topcoats for use with UV light curable inks.

BACKGROUND OF THE INVENTION

The covers of golf balls available today are typically formed from a variety of materials such as balata, i.e., trans polyisoprene, polyurethane, and/or ionomer resins, e.g., SURLYN® and IOTEK®, depending upon the desired performance characteristics of the golf ball. These balls are produced with various colors, such as white, yellow, orange, and pink, and are typically colored by painting the outer surface of the ball, or by incorporating a pigment directly into the cover composition. Generally, the ball is also stamped with identifying indicia such as a trademark, logo, identification number, model name, number, or the like. Typically, in the case of a painted ball, a primer layer is first applied to the cover, the ball is stamped, and then a second, finishing coat is applied. Alternatively, when the pigment is incorporated directly into the cover layer, a primer coat, which may be colored or transparent is applied, the ball is stamped with identifying indicia, and a clear topcoat layer is applied to provide a high gloss, and to enhance the overall appearance of the ball.

Clear topcoats are often applied to protect the ball, any clear or colored paint layers, and any identifying indicia. The topcoats also add a pleasing appearance to the ball due to their high gloss and mirror-like surface. Clear topcoats are generally free of pigmentation, and are water white. However, they may contain small amounts of dye, pigment, and other materials, as long as the topcoat is substantially transparent. In addition, topcoats typically contain an optical brightener that absorbs solar UV light at wave lengths of from about 370 to about 400 nm, and emits visible light to enhance the appearance of the ball, and a light stabilizer package to protect the golf ball cover coating from degradation due to exposure to solar UV radiation.

Protective, clear topcoat materials are well known in the art. Generally, they include urethanes, urethane hybrids, polyesters and acrylics. A cured polyurethane is the most widely used material for protective topcoats, and is typically formed from either a "one component" or "two component" system. One component systems are generally made up of minute polymeric particles, which are typically pre-reacted to form high molecular weight polymers, and are suspended or dispersed in one or more solvents or water. Curing and subsequent formation of a coating results from the evaporation of the solvent or water. In two component systems, the primary reactants are kept separate prior to use. Upon mixing of the reactants, polymerization occurs, and the mixture may be applied to the ball to form a topcoat. In forming such a topcoat, the reaction may be accompanied or followed by evaporation of the solvent. Typical two component polyurethane systems include separate packages of a polyol component and an isocyanate component that are mixed together to yield a thermoset coating composition. Both water-based and nonaqueous solvent-based polyurethane systems are available.

As noted above, identifying indicia, such as a trademark, logo, identification number, or model name or number, are typically stamped either directly onto the cover or primer coat prior to application of the topcoat. For mass produced golf balls, a printing technique typically referred to as "production printing" is used. "Production printing" refers to a process wherein the ink is applied directly to the cover or to the primer coat before a topcoat is applied. The image produced by the ink is called a "production" print, and the ink used is a "production" ink. Normally, with a production ink, exposure of the topcoat to UV light is not a part of the process of making of a golf ball.

However, manufactures often receive orders for a limited number of custom balls that are to be marked with a custom logo or insignia. For such a limited production run, it is typically more economical to use a technique known as logo printing in which the ink is applied to the topcoat on the surface of finished balls. Therefore, an ink that cures rapidly to prevent the smearing and transfer of the ink to other balls or to ball handling equipment is required. Accordingly, a UV curable ink is preferable for use in logo printing. To cure these inks, the ink and the golf ball must be exposed to UV light, which typically has a wavelength range of from about 200 to about 400 nm. This causes a photoinitiator in the ink to produce highly reactive moieties, such as free radicals, that initiate the reactions that polymerize and cure the materials in the ink.

Because prior art stabilizer packages are designed to provided protection from only solar UV radiation, they are typically formulated as broad spectrum absorbers that provided protection across the entire solar UV spectrum, i.e., about 300 to about 400 nm, or as narrow spectrum absorbers that provide protection at wavelengths between about 300 nm and about 330 nm, where each UV light photon contains more energy than photons having a longer wavelength, and is thus capable of causing more damage to the topcoat. Protection from UV radiation having wavelengths of less than about 300 nm is typically not required where the only source of UV light is the sun, because little or no solar radiation at wavelengths shorter than 300 nm normally reaches the earth, due its absorption by ozone and other chemical species in the upper atmosphere. As a result, prior art light stabilizer packages fail to absorb at all UV wavelengths provided by UV sources for curing UV curable inks, and, thus, are not totally compatible with processes for curing UV curable inks. Exposure of a topcoat containing a prior art light stabilizer package to UV light during the ink curing process would result in discoloration or yellowing of the topcoat.

In addition, prior art topcoats incorporating broad spectrum light stabilizer packages, which absorb at wavelengths from about 300 to about 400 nm, the light stabilizer package competes with the optical brightener for UV light at wavelengths at or above about 370 nm. As a result, the brightness of the topcoat is reduced unless a high concentration of optical brightener is present in the topcoat to provide the desired brightness when exposed to sunlight. Because the molecular structure of optical brighteners typically includes aromatic moieties, optical brighteners can contribute to the yellowing of the topcoat. When exposed to high intensity UV light during the curing process, the optical brightener absorbs the UV light, which may produce free radicals, or result in rearrangement of electrons. This results in the production of chromophores that cause the topcoat to visibly discolor or yellow if the chromophores are present in sufficient quantity. Therefore, when broad spectrum light stabilizers are used with UV curable inks, the absorption of UV light by the high concentration of optical brightener required to obtain the desired brightness produces a large number of chromophores, and an undesirable amount of discoloration or yellowing results.

Prior art golf ball topcoats include that of U.S. Pat. No. 5,156,405 to Kitaoh et al., which discloses a golf ball having a core, an ionomer cover, and a clear paint outer layer, where the cover and the outer layer each comprise a light stabilizer and a UV light absorber. The light stabilizer and UV light absorber are present in the cover in an amount of from 0.1 to 5 parts, based on 100 parts by weight ionomer resin, and in the clear paint in an amount of from 0.1 to 20 parts, based on 100 parts by weight paint solid. The ratio of the amount of light stabilizer ranges from 75/25 to 25/75 in the cover, and from 75/25 to 5/95 in the clear paint. The paint further comprises a fluorescent whitening agent in an amount of 0.04 to 1.6 parts by weight, based on 100 parts by weight solid paint. The light stabilizer and UV light absorber are added to prevent the deterioration of the cover and the clear paint layer on exposure to solar UV radiation.

The light stabilizers disclosed in the Kitaoh '405 patent are hindered amine light stabilizers ("HALS"), such as bis(2,2,6,6-tetramethyl-4-piperidyl)-sebacate and bis(1,2,2,6,6-pentamethyl-4-piperidyl)sebacate, available commercially from Sankyo Co. Ltd. as SANOL LS 770 and SANOL LS 76J. The UV light absorber may be a salicylic acid derivative, benzophenone, benzotriazole, substituted acrylonitrile or nickel complex, such as Tinuvin 990 from Ciba-Geigy Co. or Uvinul N-35 from BASF. The exemplified golf balls had reduced deterioration and delamination of the clear paint layer following a 100 hour weathering test.

U.S. Pat. No. 4,865,326 to Isaac et al. disclose a golf ball having an outer clear coat that incorporates an optical brightener. Disclosed optical brighteners include stilbene derivatives, styryl derivatives of benzene and biphenyl, bis(benzazol-2-yl) derivatives, coumarins, carbostyrils, naphthalimides, derivatives of dibenzothiophene-5,5-dioxide, pyrene derivatives, and pyridotriazoles.

U.S. Pat. No. 5,494,291 to Kennedy discloses a golf ball having a fluorescent cover and a UV light blocking, visibly transparent topcoat. The cover contains a fluorescent material that absorbs at least some UV light at wavelengths greater than 320 nm and emits visible light. The topcoat contains a narrow-spectrum, short wavelength UV absorber, so that the topcoat absorbs more UV light having a wavelength of about 320 nm than UV light having a wavelength of about 350 nm. In the preferred embodiment, the topcoat absorbs at least ten times as much UV light at 320 nm than at 350 nm. The absorption spectrum of the UV light absorber disclosed in U.S. Pat. No. 5,494,291 is shown in FIG. 1, which illustrates that the amount of absorption provided by the UV light absorber at the wavelengths used to cure UV curable inks is not sufficient to prevent discoloration or yellowing in topcoats during the curing process. In particular, the UV light absorber disclosed in U.S. Pat. No. 5,494,291 fails to provide adequate protection at wavelengths greater than about 330 nm and less than about 290 nm.

All of the prior art light stabilizer packages either absorb light at all solar UV wavelengths, or absorb primarily at shorter, higher energy solar UV wavelengths, and, thus, fail to absorb at all of the wavelengths used to cure UV curable inks. Therefore, a need exists for a light stabilizer package that protects the topcoat from both solar UV and UV light used to cure UV curable ink, but which has low absorption at higher UV wavelengths to allow the use of reduced levels of optical brightener, to reduce or prevent discoloration and yellowing.

SUMMARY OF THE INVENTION

The present invention relates to a UV light resistant, visibly transparent, urethane golf ball topcoat composition for use with UV curable ink and to golf balls comprising a cover, a core, and such a topcoat composition. The topcoat composition comprises an optical brightener and a light stabilizer package.

The optical brightener absorbs at least some ultraviolet light at wavelengths greater than about 350 nm, and emits visible light, and is present in an amount sufficient to visibly increase the brightness of the ball. Preferably, the optical brightener has a UV light absorbance peak at a wavelength of from about 370 nm to about 390 nm. The preferred optical brightener is 2,2'-(2,5-thiophenedyl) bis(5-tert-butylbenzoxazole).

The light stabilizer package comprises at least one UV light absorber, present in amounts sufficient to visibly reduce or eliminate discoloration of the ball on exposure to UV light used to cure the UV curable ink, and, optionally, at least one light stabilizer, preferably a HALS. The UV light absorber has an absorption peak at a wavelength between about 330 nm and about 360 nm, preferably from about 340 nm to about 350 nm, and a UV light absorbance at a wavelength of about 350 nm that is at least about 3 times greater than the UV light absorbance at a wavelength of about 370 nm. In preferred topcoat compositions, the absorbance of the UV light absorber is about 5 times greater at a wavelength of from about 340 nm to 350 nm than at a wavelength of about 370 nm, and is about 10 times greater at a wavelength of from about 340 nm to 350 nm than at a wavelength of about 380 nm. The preferred UV absorber is 2,4-Bis(2,4-dimethylphenyl)-6-(2-hydroxy-4-isooctyloxyphenyl)-1,3,5-triazine, and the preferred light stabilizer is 3-Dodecyl-1-(2,2,6,6-tetramethyl-4-piperidinyl)-2,5-pyrrolidinedione.

Typically, urethane golf ball topcoat compositions in accordance with the invention comprise a urethane polyol component and an isocyanate component. The optical brightener is present in an amount of about 0.1 to about 0.6 parts, and the UV light absorber is present in an amount of about 1 to about 6 parts, based on the solids content of the polyol. When present, the optional HALS is included in an amount of about 0.05 to about 2 parts, based on the solids content of the polyol.

The invention also relates to a method of preventing discoloration of a golf ball upon UV curing. The method of the invention that comprises forming a golf ball having a cover and a core, preparing a UV light resistant visibly transparent, urethane golf ball topcoat composition by preparing a mixture comprising a polyol resin, a polyisocyanate, an optical brightener, at least one UV light absorber, and, optionally, at least one HALS, as described above. The optical brightener is added in an amount of about 0.1 to about 0.6 parts, the UV light absorber in an amount of about 1 to about 6 parts, and, if desired, the optional HALS ay be added in an amount of about 0.05 to about 2 parts, based on the solids content of the polyol. A topcoat is then formed on the golf ball with the urethane golf ball topcoat composition, and an image is formed on the topcoat with a UV curable ink. To cure the ink, the ink on the golf ball topcoat is exposed to UV light at a wavelength and in an amount and for a time sufficient to cure the ink, thereby curing the ink.

Preferably, the UV light for curing the ink is obtained from a UV source that provides at least about 98 percent of the UV light energy at wavelengths of less than about 370 nm. Typically, the ink on the golf ball is exposed to UV light having a wavelength of from about 200 nm to about 400 nm for a period of from about 0.05 seconds to about 2 seconds.

On exposure of the topcoat to UV light from the sun or from a UV source used to cure a UV light curable ink deposited upon the topcoat, the UV light absorber absorbs at least a portion of the UV light at wavelengths between about 200 nm and about 370 nm, and, when present, the light stabilizer scavenges free radicals formed in the topcoat as a result of the exposure to UV light. Both the absorption of the UV light and the scavenging of free radicals protect the topcoat from discoloration, including yellowing, or other similar UV induced damage. However, the light stabilizer package also transmits a sufficient amount of UV light in the wavelength region where the optical brightener absorbs to allow the use of a reduced amount of the optical brightener, while maintaining the brightness of prior art golf balls. The use of a reduced amount of the optical brightener further reduces or eliminates yellowing of the topcoat when exposed to UV light during the ink curing process.

DETAILED DESCRIPTION OF THE INVENTION

As used herein, the term "light stabilizer package" refers to a composition containing a UV light absorber and, optionally, a light stabilizer, where the light stabilizer package is used to protect a golf ball cover and topcoat from degradation and discoloration or yellowing from exposure to UV light. In addition, the terms "UV", "UV light", and "UV radiation" are all used interchangeably, and refer to invisible electromagnetic radiation, i.e., invisible light, having a wavelength that is greater than that of X-rays, but no more than about 400 nm. Typically, the UV radiation referred to in this application is either solar UV, having a wavelength range of from about 300 to about 400 nm, or UV radiation that is provided by a UV source for curing UV curable inks, which typically has a wavelength range of from about 200 nm to about 400 nm.

The present invention relates to a visibly transparent golf ball cover topcoat for use with UV curable inks. The topcoat of the invention comprises a light stabilizer package and an amount of optical brightener that is reduced in comparison to the amount typically used in prior art golf balls. Typically, the topcoat of the invention is a urethane containing a light stabilizer package, comprising from about 1 to about 6 parts of a UV light absorber and, optionally, from about 0.05 to about 2 parts of a light stabilizer, such as a HALS, i.e., a hindered amine light stabilizer, based on the solids content of the polyol in the topcoat. In addition, the topcoat contains from about 0.1 to about 0.6 parts of an optical brightener.

Figure 1:
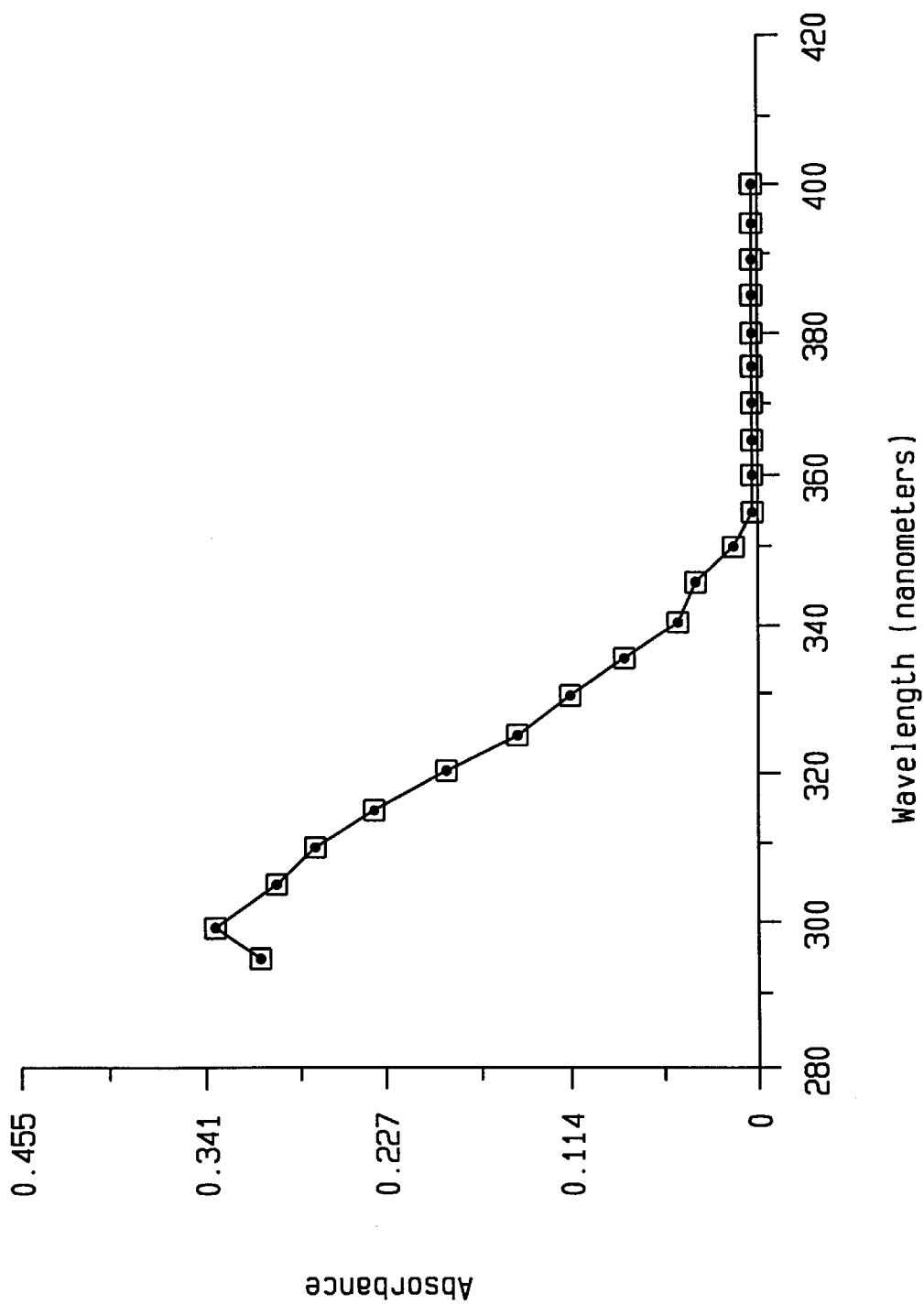
FIG. 1 illustrates the UV absorption spectrum of a typical prior art UV light absorber.
Figure 2:
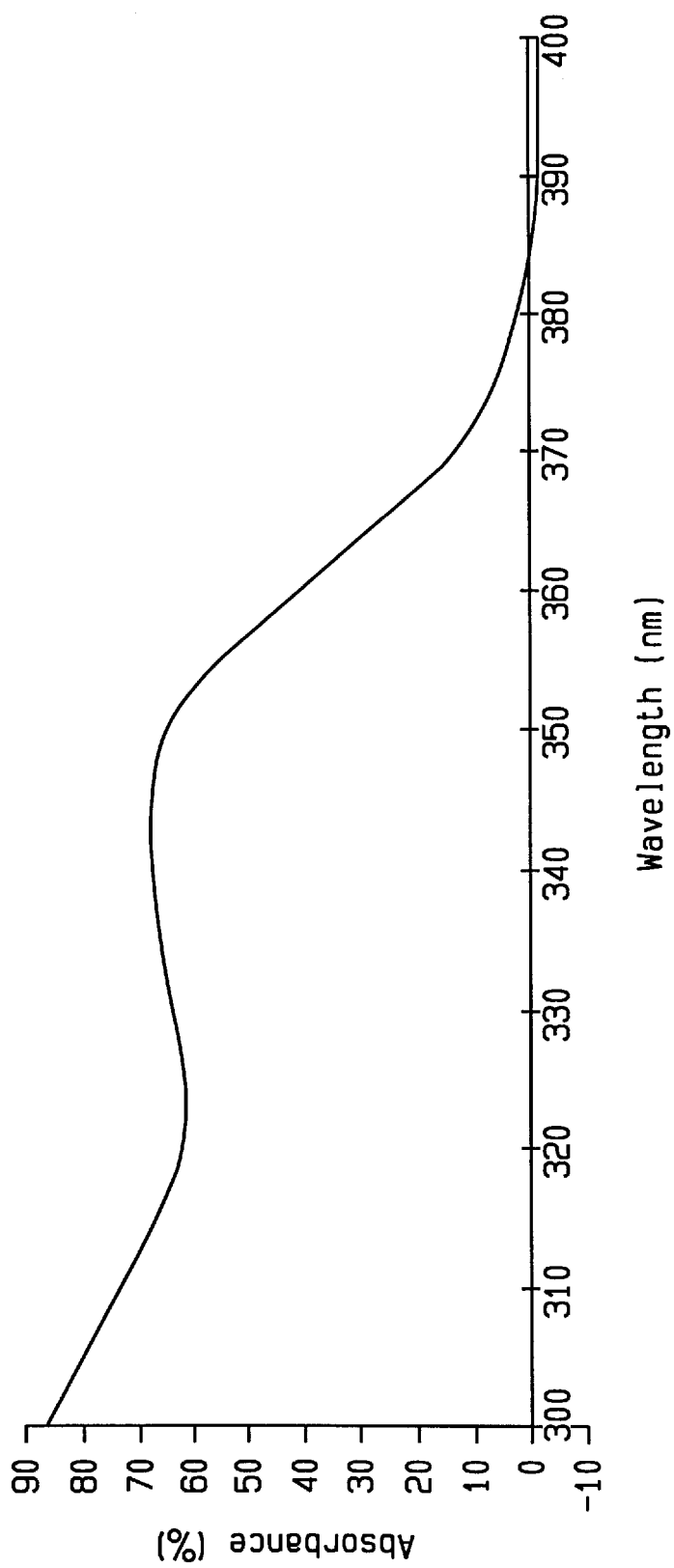
FIG. 2 illustrates the UV absorption spectrum of a light stabilizer package according to the invention.
Figure 3:
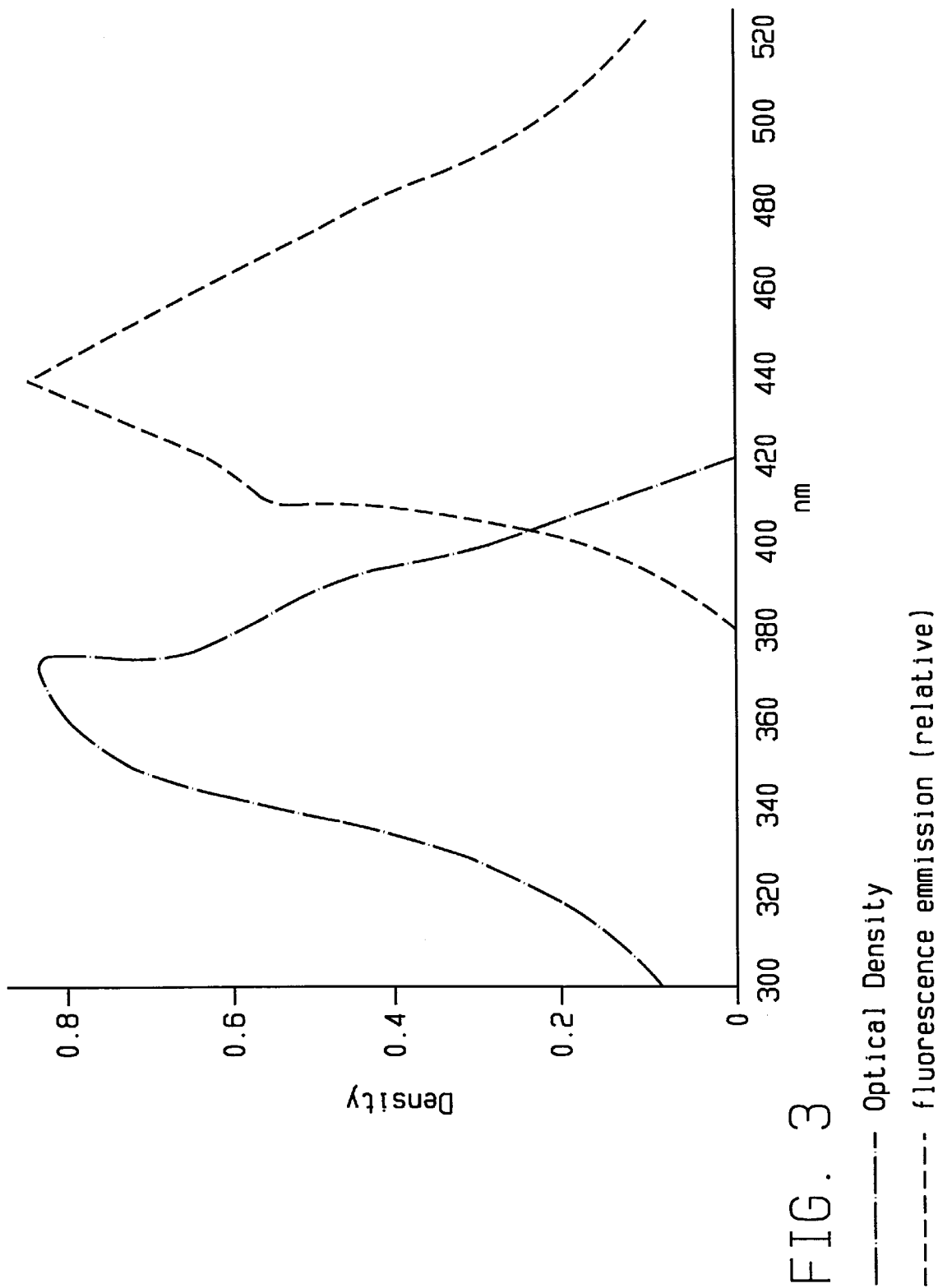
FIG. 3 is the absorption and emission spectra of an optical brightener useful in the invention.

The light stabilizer package of the invention comprises a UV light absorber, such as CYAGARD-1164 L® (2,4-Bis (2,4-dimethylphenyl)-6-(2-hydroxy-4-isooctyloxyphenyl)-1,3,5-triazine), available commercially from Cytec Industries, Inc., West Paterson, N.J., and, optionally, a light stabilizer, typically a hindered amine light stabilizer ("HALS"), such as SANDUVOR 3055® (3-Dodecyl-1-(2, 2,6,6-tetramethyl-4-piperidinyl)- 2,5-pyrrolidinedione), available commercially from Clariant Corporation of Charlotte, N.C. The absorbance spectrum for a light stabilizer package comprising CYAGARD® 1164 L and SANDUVOR® 3055 is shown in FIG. 2. Useful optical brighteners, which absorb UV light and emit visible light, and, thus, enhance the visibility and appearance of the ball, include, but are not limited to, coumarins, oxazinones, stillbenes, napthalic compounds, pyrazolines, and derivatives thereof. Preferably the optical brightener is 2,2'(2,5-thiophenedyl) bis(5-tert-butylbenzoxazole), which is available commercially as UVITEX® OB from Ciba Geigy. The absorption and emission spectra of UVITEX® OB, which has an absorption peak of about 370 nm to about 380 nm, are given in FIG. 3.

The light stabilizer package of the invention absorbs strongly at UV wavelengths less than about 350 nm, and has an absorption peak at a wavelength of about 340 nm with a sharp absorption cutoff at wavelengths above about 350 nm, providing little or no absorbance of UV light at wavelengths greater than about 370 nm. Therefore, the light absorber and the light stabilizer package as a whole do not compete strongly with the optical brightener for UV light above about 350 nm. This allows reduced amounts of optical brightener to be used, while maintaining the brightness of prior art topcoats, and preventing the yellowing of the topcoat during a process for curing UV curable ink.

Typically, a UV source for curing UV curable inks printed on the topcoat of the invention produces UV light over a wavelength range of from about 200 to about 400 nm, as well a some visible light having a wavelength of over 400 nm. Therefore, prior art light absorbers, which are formulated to provide protection only from solar UV radiation at wavelengths greater than about 300, do not provide adequate protection at the shorter wavelengths produced by the UV source.

Although a typical UV source produces at least some UV light at substantially all wavelengths between about 200 and about 400 nm, most of the UV light is produced within relatively narrow spectral bands. For example, a mercury vapor lamp normally has spectral bands at from about 250 to about 270 nm, from about 300 to 320 nm, and from about 360 to about 370 nm. As a result, at least about 60 percent of the energy produced by the lamp between 250 and 300 nm is produced in the band between about 250 and about 270. Similarly, at least about 80 percent of the energy produced between 300 and 350 nm is produced in the band between about 300 and about 320 nm, and at least about 85 percent of the energy produced between 350 and 400 nm is produced in the band between about 360 and about 370 nm. However, less than 1 percent of the energy of the UV source is emitted at UV wavelengths greater than about 370 nm.

For curing, the ink is exposed to UV light from such a source for a period of from about 0.05 to about 2 seconds, preferably, from about 1 second to about 1.5 seconds. One skilled in the art will understand that the time for the exposure to UV radiation will vary with the thickness of the ink to be cured and the level of photoinitiator and colorant present in the ink. The UV dosage is generally in the range from about 0.4 joules/cm$^2$ to about 10 joules/cm$^2$ and, preferably, from about 1 joule/cm$^2$ to about 4.00 joules/cm$^2$. UV radiation sources are well known to those skilled in the art. Commercially available UV radiation sources include, but are not limited to, Fusion Model 300 from Fusion Systems Corp. of Rockville, Md., Hönle Model UVA Print 740 (e.g., fitted with a D bulb, H bulb, Q bulb, V bulb, or other bulb known in the art having an output wavelength from about 200 nm to about 450 nm) from Hönle Corp. of Marlboro, Mass. and UVEXS models designated as UVEXS Model CCU, UVEXS Model ECU, UVEXS Model SAC, UVEXS Model SACC, UVEXS Model OCU, UVEXS SCU and UVEXS Model 471, available from Ultraviolet Exposure Systems, Inc. of Sunnyvale, Calif.

Typical prior art urethane topcoats tend to yellow or discolor when exposed to UV light of the wavelength and intensity used to cure UV curable inks. It is believed that the yellowing is due, at least in part, to the presence of the optical brightener in the topcoat. Without being bound by theory, it is believed that when the optical brightener in the topcoats is exposed to intense UV light, a large number of free radicals are released or electrons are rearranged, resulting in the formation of chromophores. As a result, the urethane topcoat yellows.

As a result of the absorption spectrum of the light stabilizer package and the emission spectrum of a typical UV light source, the golf ball topcoats of the invention can be used with UV curable inks without degradation or discoloration or yellowing upon exposure to the UV light used during the curing process. The UV source produces little UV radiation at wavelengths greater than 370 nm, and the light stabilizer package absorbs at wavelengths less than 370 nm. Therefore, the exposure of the optical brightener to UV light during the curing process is minimized. In addition, because there is little absorbance by the light stabilizer package at wavelengths above about 370 nm, lower levels of optical brightener can be used while maintaining the brightness of prior art golf balls. As a result, the production of reactive moieties that result in chromophores by the optical brightener is minimized, which also reduces or substantially eliminates discoloration and yellowing of the topcoat. The brightness of the ball is maintained because there is more solar UV light available to the optical brightener at wavelengths above 370 nm. Thus, the reduced amount of optical brightener absorbs a sufficient amount of UV light, and emits more visible light than is possible for a corresponding amount of optical brightener with a light stabilizer package that has significant absorption at wavelengths above 370 nm.

The following non-limiting examples are merely illustrative of the preferred embodiments of the present invention, and are not to be construed as limiting the invention, the scope of which is defined by the appended claims. The amounts of each of the components in the examples are in parts by weight, based on the solids content of the polyol, which is typically about 42 percent solids.

EXAMPLES

Example 1

A prior art urethane topcoat composition was prepared by combining the ingredients in Table 1 in the order listed. The solvents methyl isobutyl ketone ("MIBK") and methyl ether propylene glycol acetate ("PM Acetate") were combined with the UVITEX® OB optical brightener, a flow additive of cellulose acetate butyrate and a UV absorber package of TINUVIN® 328 UV and TINUVIN® 292 UV.

The mixture was blended until all components were dissolved in the solvents, and a homogenous mixture was formed. A polyester polyol representing the polyol component of the urethane topcoat, and having an equivalent molecular weight of 225 was then added to the mixture. A hexamethylene based polyisocyanate solution (Desmodur N-75 from Bayer, USA) representing the isocyanate component was then added. The ratio of isocyanate solution to polyester polyol was 40:100, representing an isocyanate index of 1.3. The amount of optical brightener was 0.71 percent, based on polyol solids of 39.9 percent.

TABLE 1

| Polyol Component | |
|---|---|
| MIBK | 236.0 |
| PM Acetate | 189.0 |
| UVITEX ® OB | 2.2 |
| Cellulose acetate butyrate | 10.1 |
| TINUVIN ® 328 | 9.4 |
| TINUVIN ® 292 | 4.1 |
| Polyol | 324.0 |
| | 774.8 |
| Isocyanate Component | |
| DESMODUR N-75 | 310.0 |

Golf balls comprising a visibly transparent topcoat were prepared by applying the topcoat composition to waterborne primed golf balls, and allowing the topcoat to dry. A UV curable ink in the form of a test pattern was then applied to the dried topcoat on each ball, and cured with a Fusion Systems Model 300 UV source for a period from about 0.05 to about 2 seconds. The intensity of the UV light on the topcoat ranged from about 1 to about 4 joules/cm$^2$.

Following the exposure to the UV light used to cure the UV curable ink, the urethane topcoat was visibly yellowed to an unacceptable degree.

Example 2

A golf ball two-pack polyurethane topcoat in accordance with the invention was prepared in a manner similar to that of Example 1 by combining the ingredients of Table 2 in the order listed. The topcoat of Example 2 differs from that of Example 1 in that a light stabilizer package according to the invention replaced the light absorbers of Example 1, and a reduced amount of optical brightener was used. In particular, CYAGARD® 1164 L replaced the 100 percent solids TINUVIN® 328 on an equal solids basis, the TINUVIN® 292 was replaced by SANDUVOR® 3055, and the amount of UVITEX® OB was reduced to 0.39 percent, based on the solids content of the polyol.

TABLE 2

| Polyol Component | |
|---|---|
| MIBK | 236.0 |
| PM Acetate | 189.0 |
| UVITEX ® OB | 1.2 |
| Cellulose acetate butyrate | 10.1 |
| CYAGARD ® 1164 L | 12.1 |
| SANDUVOR ® 3055 | 3.9 |
| Polyol | 324.0 |
| | 776.3 |
| Isocyanate Component | |
| DESMODUR N-75 | 310.0 |

Coated golf balls were prepared with the topcoat of the invention, dried, printed with ink, and exposed to UV light in the same manner as Example 1. The visible yellowing observed in the golf balls of Example 1 was reduced or eliminated with the topcoat of the invention.

Example 3

Urethane golf ball top coat compositions of the types described in Examples 1 and 2 were prepared and applied to samples of primed golf ball cover material. The samples were then tested for brightness and resistance to yellowing on exposure to UV radiation. The results of the tests are given in Table 3. The yellowness measurements are based on a color scale that provides positive values for yellow and negative values for blue. Therefore, the yellowness values are negative, due to the blue coloration of the golf ball cover materials.

TABLE 3

|  | A | B |
| --- | --- | --- |
| Composition | 3% TINUVIN 328 | 3% CYAGARD 1164 |
|  | 1.5% TINUVIN 292 | 1.5% SANDUVOR 3055 |
|  | 0.71% UVITEX OB | 0.38% UVITEX OB |
| Brightness[1] | 92.55 | 92.11 |
| Yellowness[2] Unexposed | −22.08 | −21.76 |
| Yellowness[2] 120 Hr. QUV | −9.63 | −7.17 |
| Yellowness[2] 4× Fusion Curing Unit | −5.38 | −14.11 |

[1]ASTM E313, unexposed.
[2]ASTM D1925

These results clearly demonstrate that the brightness of golf ball cover materials coated with the topcoat of the invention is substantially the same as that provided with prior art topcoats, even though the amount of optical brightener used in the topcoat composition of the invention is only about half that used in the prior art topcoat. Moreover, the amount of yellowing that results from exposure to UV radiation from a UV curing unit with the topcoat composition of the invention is significantly less than that observed with the prior art topcoat, while the amount of yellowing produced from environmental UV exposure is only slightly higher than that of the prior art topcoats.

While it is apparent that the invention disclosed herein is well calculated to fulfill the objects stated above, it will be appreciated that numerous modifications and embodiments may be devised by those skilled in the art. Therefore, it is intended that the appended claims cover all such modifications and embodiments that fall within the true spirit and scope of the present invention.

We claim:

1. A UV light resistant, visibly transparent, urethane golf ball topcoat composition, which comprises an optical brightener that absorbs at least some ultraviolet light at wavelengths greater than about 350 nm, and emits visible light, and a light stabilizer package, the light stabilizer package comprising at least one UV light absorber, wherein the UV light absorber has an absorption peak at a wavelength between about 330 nm and about 360 nm and a UV light absorbance at a wavelength of about 350 nm that is at least about 3 times greater than the UV light absorbance at a wavelength of about 370 nm, wherein the optical brightener is present in an amount sufficient to visibly increase the brightness of the ball, and the light absorber is present in an amount sufficient to visibly reduce or eliminate discoloration of the ball on exposure to UV light used to cure the UV curable ink.

2. The urethane golf ball topcoat composition of claim 1, wherein the UV light absorber absorption peak is at a wavelength of from about 340 nm to about 350 nm.

3. The urethane golf ball topcoat composition of claim 1, wherein the absorbance of the UV light absorber is about 5 times greater at a wavelength of from about 340 nm to 350 nm than at a wavelength of about 370 nm.

4. The urethane golf ball topcoat composition of claim 1, wherein the absorbance of the UV light absorber is about 10 times greater at a wavelength of from about 340 nm to 350 nm than at a wavelength of about 380 nm.

5. The urethane golf ball topcoat composition of claim 1, wherein the optical brightener has a UV light absorbance peak at a wavelength of from about 370 nm to about 390 nm.

6. The urethane golf ball topcoat composition of claim 1, wherein the optical brightener is selected from the group consisting of coumarins, oxazinones, stillbenes, napthalic compounds, pyrazolines.

7. The urethane golf ball topcoat composition of claim 1, wherein the optical brightener is 2,2'-(2,5-thiophenedyl)bis (5-tert-butylbenzoxazole).

8. The urethane golf ball topcoat composition of claim 1, wherein the UV absorber is 2,4-Bis(2,4-dimethylphenyl)-6-(2-hydroxy-4-isooctyloxyphenyl)-1,3,5-triazine.

9. The urethane golf ball topcoat composition of claim 1, wherein the light stabilizer package further comprises a light stabilizer.

10. The urethane golf ball topcoat composition of claim 9, wherein the light stabilizer is 3-Dodecyl-1-(2,2,6,6-tetramethyl-4-piperidinyl)-2,5-pyrrolidinedione.

11. The urethane golf ball topcoat composition of claim 1, further comprising a urethane polyol component, wherein the optical brightener is present in an amount of from about 0.1 to about 0.6 parts, and the UV light absorber is present in an amount of from about 1 to about 6 parts by weight, based on the solids content of the polyol.

12. The urethane golf ball topcoat composition of claim 11, further comprising a light stabilizer in an amount of from about 0.05 to about 2 parts by weight, based on the solids content of the polyol.

13. A golf ball comprising a cover, a core, a UV light resistant, visibly transparent, urethane topcoat on the cover, and an UV light cured ink on the topcoat, wherein the topcoat comprises a urethane resin, an optical brightener, and a light stabilizer package, the light stabilizer package comprises at least one UV light absorber, wherein the UV light absorber has an absorption peak at a wavelength between about 330 nm and about 360 nm and a UV light absorbance at a wavelength of about 350 nm that is at least about 3 times greater than the UV light absorbance at a wavelength of about 370 nm, and the optical brightener absorbs at least some ultraviolet light at wavelengths greater than about 350 nm, and emits visible light, wherein the optical brightener is present in an amount sufficient to increase the brightness of the ball, and the light absorber is present in an amount sufficient to reduce or eliminate discoloration of the ball on exposure to UV light.

14. The urethane golf ball topcoat composition of claim 13, wherein the light stabilizer package further comprises a light stabilizer.

15. The golf ball of claim 14, wherein the light stabilizer is 3-Dodecyl-1-(2,2,6,6-tetramethyl-4-piperidinyl)-2,5-pyrrolidinedione.

16. The golf ball of claim 13, wherein the UV light absorber absorption peak is at a wavelength of from about 340 nm to about 350 nm.

17. The golf ball of claim 13, wherein the absorbance of the UV light absorber is about 10 times greater a wavelength of from about 340 nm to 350 nm than at a wavelength of about 380 nm.

18. The golf ball of claim 13, wherein the absorbance of the UV light absorber is about 5 times greater a wavelength of from about 340 nm to 350 nm than at a wavelength of about 370 nm.

19. The golf ball of claim 13, wherein the optical brightener has a UV light absorbance peak at a wavelength of from about 370 nm to about 390 nm.

20. The urethane golf ball topcoat composition of claim 13, wherein the optical brightener is selected from the group consisting of coumarins, oxazinones, stillbenes, napthalic compounds, pyrazolines.

21. The golf ball of claim 13, wherein the optical brightener is 2,2'-(2,5-thiophenedyl)bis (5-tert-butylbenzoxazole).

22. The golf ball of claim 13, wherein the UV absorber is 2,4-Bis(2,4-dimethylphenyl)-6-(2-hydroxy-4-isooctyloxyphenyl)-1,3,5-triazine.

23. The golf ball of claim 13, further comprising a urethane polyol component, wherein the optical brightener is present in an amount of about 0.1 to about 0.6 parts, and the UV light absorber is present in an amount of about 1 to about 6 parts by weight, based on the solids content of the polyol.

24. The golf ball of claim 23, further comprising a light stabilizer in an amount of about 0.05 to about 2 parts by weight, based on the solids content of the polyol.

25. A method of preventing discoloration of a golf ball upon UV curing, which comprises forming a golf ball having a cover and a core;

preparing a UV light resistant, visibly transparent, urethane golf ball topcoat composition, by preparing a mixture comprising a polyol resin, a polyisocyanate, an optical brightener, and at least one UV light absorber, wherein the UV light absorber has an absorption peak at a wavelength between about 330 nm and about 360 nm and a UV light absorbance at a wavelength of about 350 nm that is at least about 3 times greater than the UV light absorbance at a wavelength of about 370 nm, and the optical brightener absorbs at least some ultraviolet light at wavelengths greater than about 350 nm, and emits visible light, and wherein the optical brightener is present in an amount sufficient to increase the brightness of the ball, and the light absorber is present in an amount sufficient to reduce or eliminate discoloration of the ball on exposure to UV light;

forming a topcoat on the golf ball with the urethane golf ball topcoat composition;

forming an image on the topcoat with a UV curable ink; and exposing the ink on the golf ball topcoat to UV light at a wavelength and in an amount and for a time sufficient to cure the ink, thereby curing the ink.

26. The method of claim 25, further comprising selecting a UV source that provides at least about 98 percent of the UV light energy at wavelengths of less than about 370 nm.

27. The method of claim 25, further comprising adding the optical brightener in an amount of about 0.1 to about 0.6 parts, and the UV light absorber in an amount of about 1 to about 6 parts by weight, based on the solids content of the polyol.

28. The method of claim 25, wherein the ink on the golf ball is exposed to UV light having a wavelength of from about 200 nm to about 400 nm for a period of from about 0.05 seconds to about 2 seconds.

29. The method of claim 25, further comprising adding at least one light stabilizer to the mixture.

30. The method of claim 29, wherein the light stabilizer is added in an amount of about 0.05 to about 2 parts by weight, based on the solids content of the polyol.

* * * * *